Nov. 11, 1930.   S. SPIROS   1,781,200
TRIMMER FOR FILMS
Filed Nov. 20, 1926
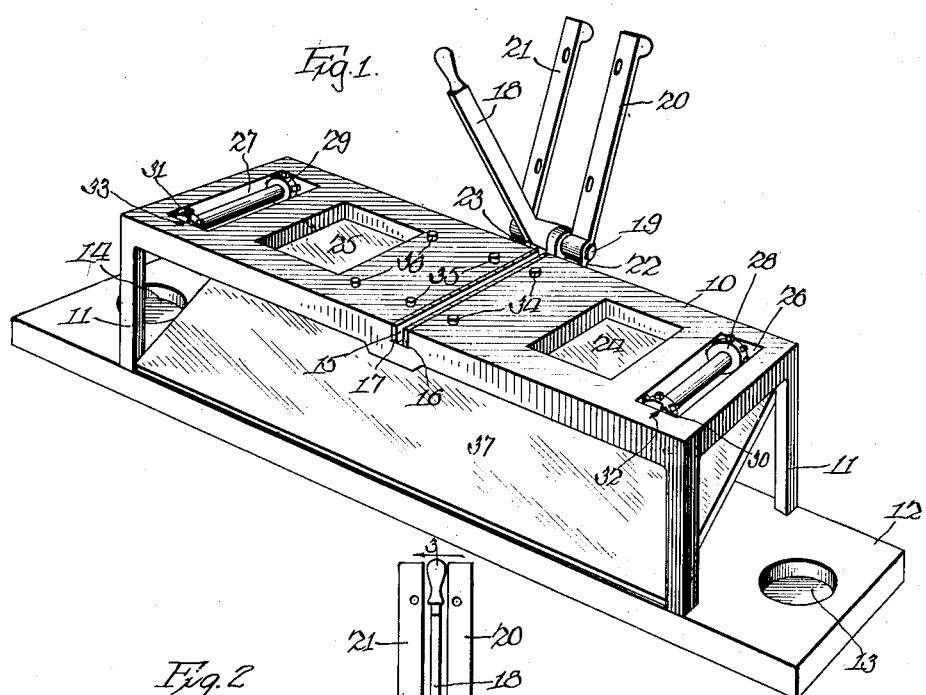
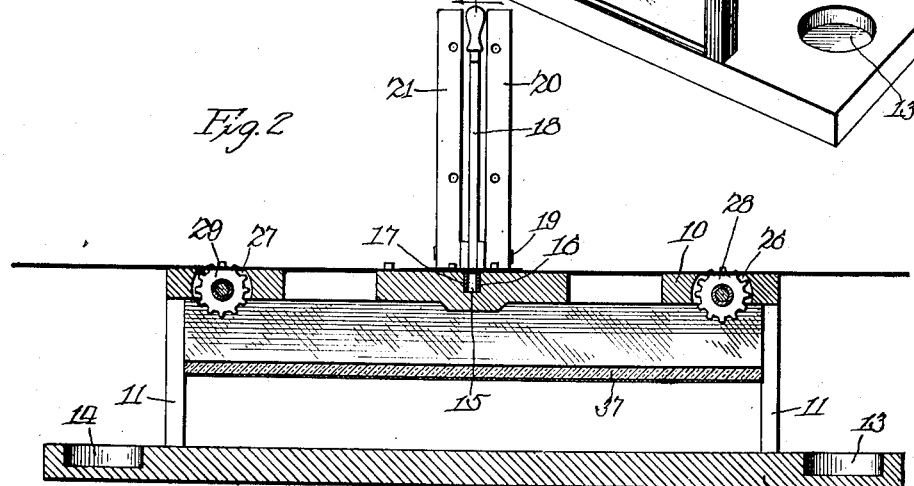
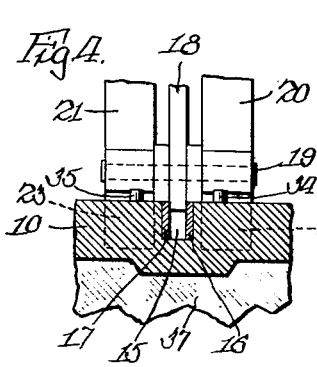
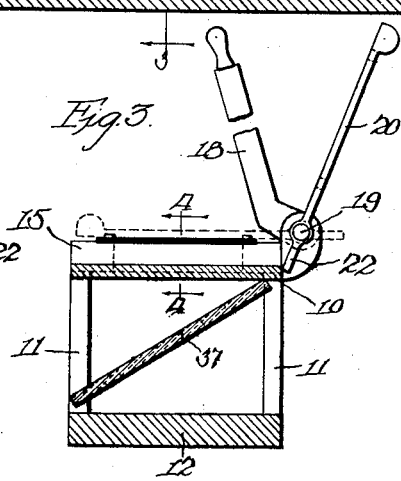
Inventor:
Sam Spiros Patented Nov. 11, 1930

1,781,200

UNITED STATES PATENT OFFICE

SAM SPIROS, OF CHICAGO, ILLINOIS

TRIMMER FOR FILMS

Application filed November 20, 1926. Serial No. 149,753.

This invention relates to a trimmer for motion picture films, and has for an object to provide a device for repairing a film by cutting away broken or defective parts in order that the ends of the films can be suitably connected and the film reused.

A further object is to provide a device of this character which will deflect the light upwardly through openings in the table in such a manner that the meeting edges of the film placed on the table to be cut may be easily discerned to properly align the film for trimming the same.

Another object of the invention is to provide a film trimmer provided with a pair of toothed wheels at each end of the table having indicators thereon, whereby the film may be aligned and squared with the openings, then set over the toothed wheels and pulled over said wheels until the indicators thereon register with the indicator marks on the table. The film is then set over pins to be held in position while the film is cut.

A still further object of the invention is to provide a film trimmer that has a table with openings of exactly the same size as one of the squares of a motion picture film to enable the perfect setting of the film to be trimmed.

Other objects and advantages of the invention will be more clearly set forth in the following specification, in which similar characters of reference designate corresponding parts throughout the several views and in which—

Figure 1 is a perspective view of my improved film trimmer;

Fig. 2 is a longitudinal sectional view;

Fig. 3 is a transverse sectional view on the line 3—3 of Fig. 2;

Fig. 4 is a section on line 4—4 of Fig. 3.

The invention is exemplified in a table member 10 provided with supports or legs 11, suitably mounted on a base 12. The base 12 is provided with cavities 13 and 14 located at each end for the purpose of placing film cement and water to be used in repairing the film.

Located centrally of the table member 10 is a transverse groove 15 which has fixed to its sides a pair of hardened steel plates 16 and 17 which have their top edges ground flush with the top of the table and serve as cutting edges for the cutting member 18. The cutting member 18 is pivotally mounted on the table as at 19. Mounted on the same pivot 19 are two fingers 20 and 21, which are provided with stops 22 and 23 for limiting their movement in one direction. The table 10 is provided with rectangular openings 24 and 25. Each end of the table 10 is provided with openings 26 and 27 in which the toothed wheels 28 and 29 are pivotally mounted, adapted to engage the perforations in the film that is placed over them. The toothed wheels 28 and 29 are provided with indicators 30 and 31. The table has marks 32 and 33 to register with the indicator, as will be more fully described.

Properly positioned adjacent the plate 16 is a pair of pins 34 to engage the perforations in the film and to perfectly align the same. Adjacent the plate 17 are a double pair of pins 35 and 36. Suitably fixed at an angle and extending the entire length of the table is a mirror or reflector 37 to reflect the light upwardly through the rectangular openings 24 and 25.

In the operation, the film to be repaired or attached, as when an insertion is to be made, is placed over the rectangular opening 24 which is exactly the same size as one of the squares of the films, and when properly aligned with the openings the free end is dropped over the pins 34 and 35. The free end of the film to be attached is then placed over the rectangular opening 25 and when properly aligned with the opening is dropped over the pins 36, 35 and 34, the fingers 20 and 21 are swung over the film to hold the same in position, when the knife 18 is then swung downwardly severing the over-lapped film, and as the cut is made against the side edges of the plates 16 and 17 a strip approximately $\frac{1}{16}$ of an inch is cut away. The knife now lowered remains in the groove 15, the back of the knife being flush with the top of the table 10. The film over the pins 34 is then removed and the film held by the pins 35 and 36 is then scraped or skinned, washed and cemented, then the removed film is placed over the pins 34, but this time in the second row of perforations, which allows for the proper over-lap; the fingers 20 and 21 are then placed over the film to offer enough pressure to hold the same.

In this manner films may be repaired or inserts made and the exact position of the squares or individual pictures properly and accurately spaced.

To properly carry out the principle of the invention, the openings 24 and 25 must be placed the proper distance from the cutting edge so that when the film is severed there will be exactly the proper margin for cementing and when the film is stepped up in the second row of perforations the squares will be equally spaced.

In some instances some parts of the films are made as a continuous picture; that is the squares blend in each other, so that it is impossible to detect one from the other. Now when such is the case, that portion of the film having the squares is properly aligned with the opening 24 the toothed wheel 28 is set so that the indicator 30 will register with the mark 32 on the table, the film is then placed over the toothed wheel 28 and the film is drawn too near the end to be cut and when the indicator registers with the table then the film is dropped over the pins 34. The other portion of the film is aligned with the opening 25 and the indicator 31 on the toothed wheel 29 is set to register with the mark 33 on the table and the film is drawn over the toothed wheels 29 too near the end to be cut, and when the indicator 31 registers with the mark 33 on the table the film is dropped over the pins 36, 35 and 34. The fingers 20 and 21 are then placed over the film to hold the same, and the knife 18 is then swung downwardly and the film severed as above described.

Although I have herein shown and described what I now consider the preferred manner of carrying out my invention, the same is merely illustrative and all changes and modifications are contempalted that come within the scope of the claims appended hereto.

I claim:—

1. In a device of the class described, the combination with a table, a plurality of aligned openings therein, supports for said table, pins interposed between said openings and fixed to said table to receive a film, and deflecting means mounted below said table for projecting light through said openings.

2. In a device of the class described, the combination with a table, a plurality of aligned openings therein, a reflector mounted to direct the rays of light through said openings, pins interposed between said openings to receive a film, a cutting member mounted to swing in the path of said film, and a pair of toothed wheels adapted to engage the film for accurately positioning the same.

3. In a trimmer for motion picture films comprising a table, supports for said table, deflecting means mounted below said table for deflecting light through aligned openings in said table, a cutting member pivotally mounted at one side of said table to cooperate with a groove provided therein, said groove having a coacting cutting edge for said cutting member, a pair of fingers pivotally mounted to straddle said cutting member, pins aligned with said openings and secured in the table, and a pair of toothed wheels mounted at each end of said table, said toothed wheels mounted for independent rotation.

4. In a device of the class described, the combination with a table having a pair of aligned openings therein, a reflector mounted to direct the rays of light through said openings, pins interposed between said openings to receive a film, and a cutting member mounted centrally of said table to cooperate with a groove provided in said table, whereby said cutting member may cut the film transversely of its length.

SAM SPIROS.